US008719808B1

(12) United States Patent
Prinzing

(10) Patent No.: US 8,719,808 B1
(45) Date of Patent: May 6, 2014

(54) METHOD AND APPARATUS FOR USING OBJECT FILES TO PROVIDE RELIABLE PROGRAM OPERATION

(75) Inventor: Timothy N. Prinzing, Aptos, CA (US)

(73) Assignee: Altera Corporation, San Jose, CA (US)

(*) Notice: Subject to any disclaimer, the term of this patent is extended or adjusted under 35 U.S.C. 154(b) by 721 days.

(21) Appl. No.: 12/694,607

(22) Filed: Jan. 27, 2010

(51) Int. Cl.
*G06F 9/44* (2006.01)
*G06F 9/445* (2006.01)

(52) U.S. Cl.
CPC ............. *G06F 8/54* (2013.01); *G06F 9/44521* (2013.01)
USPC ......................................................... 717/162

(58) Field of Classification Search
CPC ............................... G06F 8/54; G06F 9/44521
USPC ................................................ 717/162–167
See application file for complete search history.

(56) References Cited

U.S. PATENT DOCUMENTS

| | | | | |
|---|---|---|---|---|
| 5,805,899 | A * | 9/1998 | Evans et al. | 717/170 |
| 5,933,642 | A * | 8/1999 | Greenbaum et al. | 717/140 |
| 6,077,315 | A * | 6/2000 | Greenbaum et al. | 717/157 |
| 6,185,578 | B1 * | 2/2001 | Yokote et al. | 1/1 |
| 6,363,436 | B1 * | 3/2002 | Hagy et al. | 719/331 |
| 6,523,101 | B1 * | 2/2003 | Nakata | 711/169 |
| 7,734,895 | B1 * | 6/2010 | Agarwal et al. | 712/13 |
| 2008/0163375 | A1 * | 7/2008 | Savagaonkar et al. | 726/26 |
| 2009/0086981 | A1 * | 4/2009 | Kumar et al. | 380/285 |

OTHER PUBLICATIONS

"Tool Interface Standard (TIS) Executable and Linking Format (ELF) Specification Version 1.2," May 1995, TIS Committee.*

DuVarney et al., "SELF: A Transparent Security Extension for ELF Binaries," 2004, ACM, p. 29-38.*
Tong et al., "Soft-Core Processors for Embedded Systems," 2006, IEEE, p. 170-173.*
"Altera Monitor Program," 2007, Altera Corp., p. 1-32.*
"Nios II IDE Help System," May 2007, Altera Corp. p. 1-160.*
"Nios II Software Developer's Handbook," Oct. 2007, Altera Corp.*
"Altera-Provided Development Tools," May 2008, Altera Corp.*
"Nios II Flash Programmer User Guide," May 2008, Altera Corp.*
"Virtual JTAG (sld_virtual_jtag) Megafunction User Guide," Dec. 2008, Altera Corp.*
"Developing Nios II Software," Dec. 2009, Altera Corp.*
"Nios II Hardware Development Tutorial," Dec. 2009, Altera Corp.*
TIS Committee, Tool Interface Standard (TIS) Executable and Linking Format (ELF) Specification. Version 1.2, May 1995, 3 pages.
Ancmact, P., et al., "Microprocessor Soft-Cores: An Evaluation of Design Methods and Concepts on FPGAs," received Mar. 5, 2009, 8 pages.
Xilinx, "Existing Microcontroller Subsystem Design Process and Methodologies," White Paper: Comparing and Contrasting FPGA and Microprocessor System Design and Development, WP213, v1.1, Jul. 21, 2004, pp. 20-31.

* cited by examiner

*Primary Examiner* — Qing Chen
(74) *Attorney, Agent, or Firm* — Weaver Austin Villeneuve & Sampson LLP

(57) ABSTRACT

Methods and apparatus are provided to generate an enhanced object file for reliable program execution on a programmable chip. The enhanced object file includes additional hardware information added before or after the object file is linked. Various embodiments further provide techniques for reliable execution of a program on a programmable chip. The programmable chip can be verified for the appropriate hardware based on the hardware information in the enhanced object file. The hardware information may include a bitstream to reprogram a device, interface information, joint test action group (JTAG) information, etc.

21 Claims, 6 Drawing Sheets

METHOD AND APPARATUS FOR USING OBJECT FILES TO PROVIDE RELIABLE PROGRAM OPERATION

BACKGROUND OF THE INVENTION

1. Technical Field

The present disclosure relates to providing reliable program operation.

2. Description of the Related Art

An object file is an organized collection of named objects including sequences of computer instructions in machine code format. These sequences of computer instructions may be executed by a processor. For example, an object file for an embedded system may include machine code and data such as relocation information, stack unwinding information, comments, program symbols, and debugging information.

An object file format is a computer file format used for the storage of object code and related data produced by a compiler. Some commonly used and known object files formats are common object file format (COFF), executable and linkable format files (ELF), portable executable (PE), Mach-O, etc. Generally, data supported by these object file formats include BSS (Block Started by Symbol), text segment, and data segment.

Conventional object files support a range of functionalities but also have a variety of limitations. Consequently, it is desirable to provide improved mechanisms using object files to reliably execute a program on a soft core processor.

SUMMARY OF THE INVENTION

Methods and apparatus are provided to generate an enhanced object file for reliable program execution on a programmable chip. The enhanced object file includes additional hardware information added before or after the object file is linked. Various embodiments further provide techniques for reliable execution of a program on a programmable chip. The programmable chip can be verified for the appropriate hardware based on the hardware information in the enhanced object file. The hardware information may also include a bitstream to reprogram a device, interface information, joint test action group (JTAG) information, etc.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
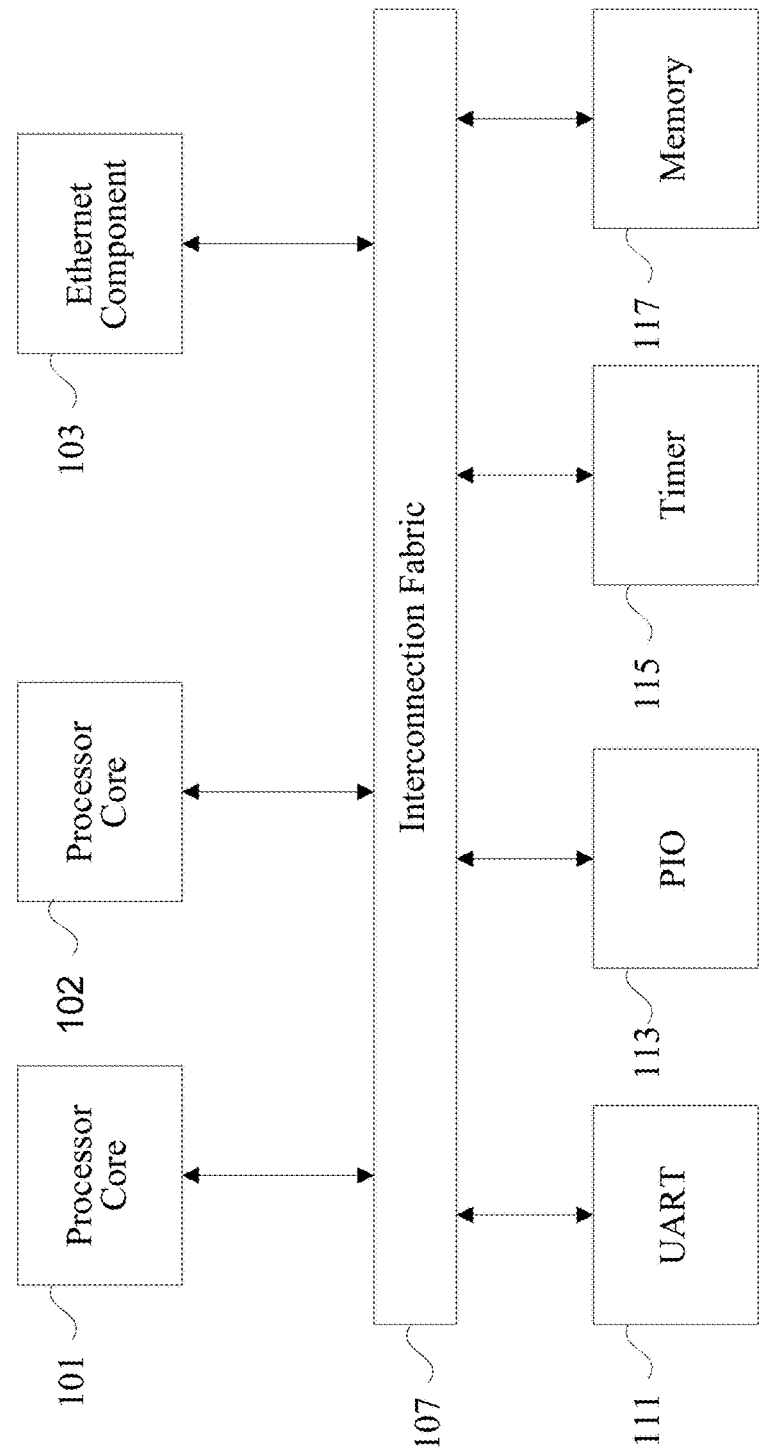
FIG. 1 illustrates one example of a system on a programmable chip.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular extensible linkable file formats.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Many conventional system on chip devices include a single or multiple identical hard core processors. A hard core processor is typically a non-configurable or minimally configurable processor fabricated on-board the chip. Hard core processors typically have cost and performance benefits over soft core processors. Based on the system and hardware requirements, a user can create a single executable to run a program on the one or more hard core processors. This single file includes all the information needed to reliably execute the program. However, a drawback of a hard core processor is its lack of flexibility. For example, hard core processors are difficult to reengineer or reoptimize and can become obsolete as new designs are required. Thus, due to this inflexibility, there is an increased growth in popularity of soft core processors over hard core processors.

In contrast to a hard core processor, a soft core processor (e.g., Nios II, PicaRisc, and Nevada) is a microprocessor defined in software, which can be synthesized using programmable logic or resources available on a device such as a Field Programmable Gate Array (FPGA). One of the many benefits of a soft core processor is that it is flexible. The processor core is not fixed in silicon and thus the logic can be changed by reprogramming the device, thus reducing engineering costs and improving design times. A consumer can implement a core if needed and can instantiate as many cores as required for the specific implementation. In some examples, a user can implement multiple soft core processors on a device where each core is differentiated and tailored to a particular use. A user can program the device without any awareness of the configurable nature of the processor core.

However, executing a program on a system on a programmable chip (SOPC) with a soft core processor entails additional complexity typically not found on system on chip implementations. For instance, a user may indicate that an executable or program should run on a particular SOPC, but the SOPC may include a number of different processor cores. The executable may only successfully run on a particular processor core. In other examples, running an executable may require details about particular input and output interfaces or other metadata about an SOPC. Some of these concerns are applicable to hard core processors and system on chip designs as well, but are particularly prevalent in soft core processor designs. Currently, only limited mechanisms are available for providing this information.

Conventionally, a separate file is saved in a file system to hold the additional hardware information. However, maintaining a separate executable and a separate hardware information file is difficult and ineffective. It can be difficult to manage version control between the two files because each file may be revised at different times in the software development cycle. There is no mechanism to ensure that both files, the executable and the hardware information file, are always available at runtime. This can cause the program to run on incorrect hardware.

Consequently, the techniques of the present invention provide mechanisms for a consumer to create a program to allow efficient and effective execution on soft core processors. According to various embodiments, the techniques of the present invention provide mechanisms to customize an extensible linkable format file to include additional hardware information to generate a single executable. These techniques allow for reliable execution of a program on a soft core processor. In some examples, the hardware information can identify a particular processor on a multiple processor device for executing a program. In other examples, the hardware information can identify particular interfaces and ports to use when executing a program. In still other examples, the hardware information can actually reprogram a programmable logic device to include the appropriate soft core processor. In still other examples, the hardware information can hold information that allows a user to determine the memory map of the processor or access virtual Joint Test Action Group (JTAG) information.

FIG. 1 is a diagrammatic representation showing one example of a system on a programmable chip that can use the techniques of the present invention. Although a system on a programmable chip is described, various techniques and mechanisms can also be applied to other systems such as SOCs and ASICs. The system includes two processor cores, a hardware accelerator, peripheral devices, and peripheral interfaces. The system on a programmable chip includes processor cores 101 and 102 and an Ethernet component 103 as well as peripheral components UART 111, PIO 113, timer 115, and data memory 117. In some examples, the Ethernet component 103 is instead a Digital Signal Processing (DSP) core, a cryptography accelerator, or a video processor.

It should be noted that the system can include both on-chip memory 117 and off-chip memory. In one example, the data memory 117 can support variable latency or fixed latency access. The components are interconnected using an interconnection fabric 107. Any mechanism or logic for connecting components in a system is referred to herein as an interconnection fabric. In one example, the interconnection fabric is a bus. In another example, the interconnection fabric is a secondary side arbitration fabric.

Additionally, it should be noted that the system is a multiprocessor system with two or more processors. The processors that make up the multiprocessor system may be single core or multi-core processors. Processor 101 and processor 102 may be autonomous or shared. In one example, processor 101 and processor 102 may not communicate with each other. Each processor may have its own memory 117, L2 cache (not shown), UART 111, and timer 115. In another example, the processor may share the L2 cache or the memory 117.

In a multiprocessor system, all processors may be equal, or some may be reserved for special purposes. For example, one processor may respond to all hardware interrupts or in other cases all the work in the system may be distributed equally among all of the processors. In another example, execution of kernel-mode code may be restricted to only one processor, whereas user-mode code may be executed in any combination of processors. Further, the architecture of the multiprocessor system can be symmetrical (SMP), asymmetrical (ASMP), non-uniform memory access (NUMA), or clustered. Lastly, the processor can be used to execute a single sequence of instructions in multiple contexts (SIMD), multiple sequences of instructions in a single context (MISD), or multiple sequences instructions in multiple contexts (MIMD), and the like.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

A system bus or slave side arbitration fabric can be used to connect individual components. In one embodiment, there is a slave side arbitrator for each slave component in a computer system instead of a single bus arbitrator. In other embodiments, there is a slave side arbitrator for selected slave components in a system.

Figure 2:
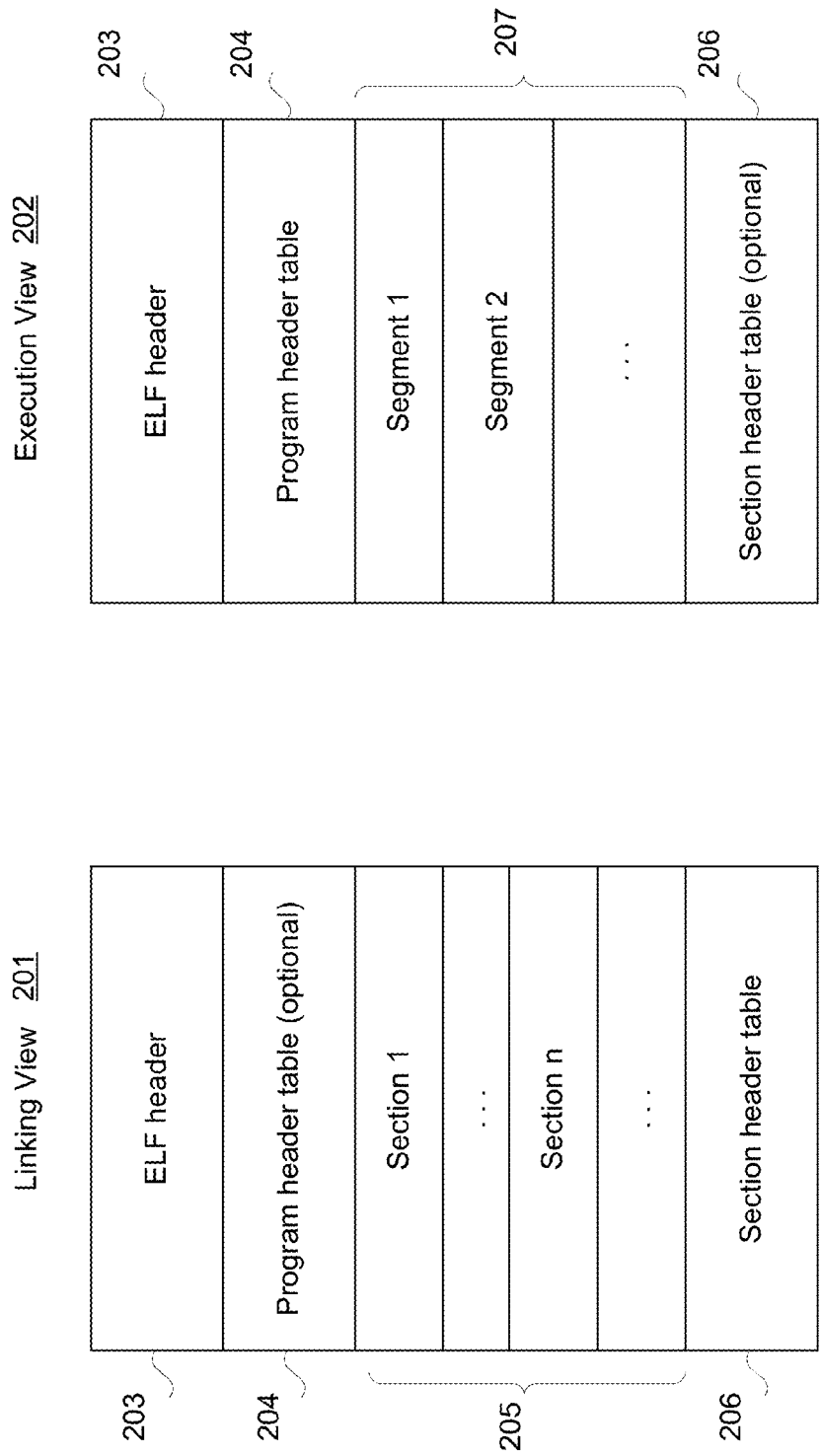
FIG. 2 illustrates one example of an executable and linkable format file found in the prior art.

FIG. 2 is a diagrammatic representation of one example of an object file, the executable and linkable format file (ELF). ELF is a common standard file format for executables, object code, shared libraries, and core dumps. The ELF file form was originally developed and published by UNIX System Laboratories (USL) as a part of the Application Binary Interface to replace the less-flexible predecessor formats, a.out and Common Object File Format (COFF). The ELF format is used in three main types of object files: relocatable files, executable files, and shared object files. Object files are binary representations of programs intended to execute directly on a processor. In various embodiments, a relocatable file holds code and data suitable for linking other object files to create an executable or a shared object file. In particular embodiments, an executable holds a program suitable for execution. The file specifies how the execution function creates a program's process image. In particular embodiments, a shared object file holds code and data suitable for linking in two contexts. First, the link editor may process it with other relocatable and shared object files to create another object file. Second, the dynamic linker combines it with an executable file and other shared objects to create a process image.

Object files participate in program linking (building a program) and program execution (running a program). ELF format provides parallel views of file's contents reflecting the differing needs of these activities—the linking view 201 and the execution view 202. First, the linking view 201 is used at the static link time to combine relocatable files. The linking view 201 contains the section header table 206 and the affiliated sections 205. Second, the execution view is used at run time to load and execute the program. The execution view 202 displays the contents of the ELF executable as it would be loaded into memory, which includes the program header 204 and segments 207.

In both views, the ELF header 203 resides at the beginning and serves as a "road map" of the file's organization. The ELF header 203 identifies the file type and target processor, and contains details about the file's structure needed for execution and loading into memory. According to various embodiments, the ELF header may contain an identity member wherein the identity member determines if the file is an ELF file. In particular embodiments, the ELF header may contain a type member wherein the type member reveals the nature of the file—such as is it an executable, shared, or a library file. In particular embodiments, the ELF header may contain offset members wherein the offset members hold the offsets in bytes for the section header table 206 and the program header table 204.

Sections 205 hold the bulk of the object file information. The sections contain a name and a type, the requested memory location at run time, and permissions (e.g., writable, executable, and the like). In particular embodiments, the ELF file contains a .text section. The .text section holds the machine code that executes when the program runs. In particular embodiments, the ELF file may contain a .data section wherein the .data section holds initialized writeable data. In yet another embodiment, the ELF file may contain a .symtab section. The .symtab section contains the symbol table which lists all the symbols used within the object file, including function names and the name of the source file. In particular embodiments, the ELF file includes a .dynsym section. The .dynsym is the dynamic symbol table, which holds symbols used in the dynamic linking process. In yet another embodiment, the ELF may include a .plt section. The .plt section is the procedure linkage table which holds the absolute addresses to functions. In particular embodiments, the ELF may include a .rela.sec section. The .rela.sec section holds the relocation data for the named sections. In yet another embodiment, the ELF may include a .strtab section wherein the .strtab section holds the string table. In yet another embodiment, the ELF may include a .dynstr section. The .dynstr is the dynamic string table which holds strings used in the dynamic linking process. The above mentioned sections are illustrative. An ELF file may include a subset of the above mentioned sections or numerous other sections as well.

A section header table 206 includes information describing the file's sections. The section header table 206 is used to locate and interpret the sections 205 in the ELF file. The section header table 206 identifies a section name, type, virtual address at execution, file offset, size in bytes, associated flags, links to other sections 205, among other information. According to various embodiments, the section type member of the section header table categorizes a section's contents and semantics. The section type member will specify and describe the nature of the file section, which hold program and control information. In particular embodiments, the section header table will include a flag member describing sections of accessibility and usage. For example, a section may be flagged as allocable and thus will be loaded into memory when the executable starts. Other sections may be flagged as nonallocable sections and only provide information to the linker and loader to create the executable.

After the file is linked, the result is an ELF executable and the format is depicted in the execution view 202. The sections 205 from the linking view 201 are rearranged into segments 207 described by the program header table 204. Additionally, various other data is present in a segment 207 for program execution, dynamic linking, and the like. According to various embodiments, an ELF file contains a LOAD segment. Executable sections from the linking view 201 are loaded in a read/write LOAD segment. For example, the read/write LOAD segment may include the .text, .rodata, .hash, .init, .fini, .dynsym, and .dynstr sections. In another example, all the read-only sections are placed in the read only LOAD segment. The read only LOAD segment may include the .data, .bss, .opd, .jcr, .got, .ctors, .dtors sections. In particular embodiments, an ELF file contains an INTERP segment where the segment holds the path name of the interpreter to be used for the executable. In yet another embodiment, an ELF file contains a DYNAMIC segment which contains information needed to perform dynamic linking.

The program header table 204 locates segment images within the file and contains other information necessary to create the process image for the program to execute. According to various embodiments, the program header table 204 contains a segment type member, which identifies how the segment is processed when loaded into memory. In particular embodiments, the program header table 204 contains a file offset member which stores the segment's location within an ELF file. In yet another embodiment, the program header 204 contains a virtual address which contains the segment's location within the effective address space. In particular embodiments, the program header table 204 contains the segment's physical address. The program header table 204 may contain the number of bytes used by a segment in the ELF file. In particular embodiments, the program header table 204 holds the number of bytes in a segment's memory image. In particular embodiments, the program header table 204 contains the segments flags of accessibility. The segment flag indicates whether the segment is readable, writeable or an executable. In yet another embodiment, the program header table 204 contains segment alignment information. The segment alignment contains information on the boundary to which the segment must be loaded in memory.

Figure 3:
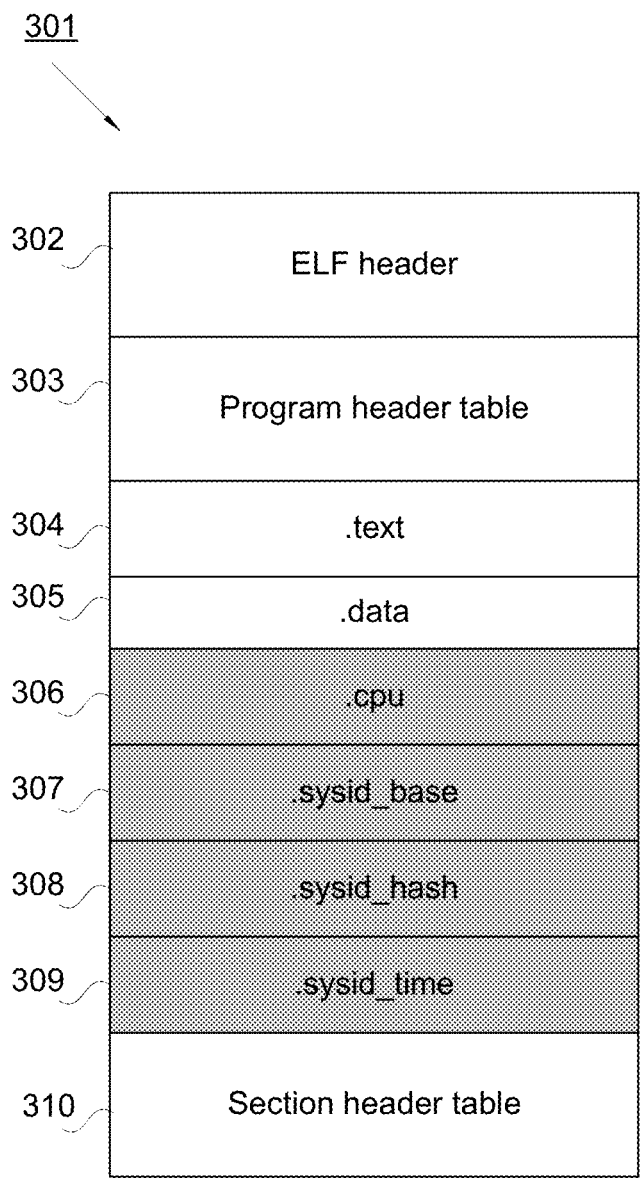
FIG. 3 illustrates an embodiment of a fat ELF file.

FIG. 3 is a diagrammatic representation of one example of a fat ELF file (i.e., an enhanced object file) 301 in the linking view. A fat ELF includes all of the standard sections 304, 305, the ELF header 302, program header table 303 and the section header table 310 similar to the ones discussed in FIG. 2. Additionally, the fat ELF file includes sections with hardware information. The hardware information sections increases the size of a standard ELF file and thus it is referred to herein as a fat ELF file. The hardware information included in the file may vary to meet the needs of the specific implementation. The hardware information sections provide information to allow a program to reliably execute on the proper hardware. In various embodiments, the fat ELF file may include a .cpu section 306 wherein the .cpu section identifies a particular processor for executing a program. In particular embodiments, the fat ELF may include the .sysid_base section. The .sysid_base section 307 holds the address in the processor's address space where the system id should be located to determine which device is programmed with the expected hardware. In particular embodiments, the fat ELF file may include a .sysid_hash section 308 which represents the hash of a system design. The hash information is useful for identifying whether the program is running on the correct hardware. For instance, if a hash is not located at a given address, then the hardware does not match the program. In yet another embodiment, a fat ELF file may include a .sysid_time section 309. A .sysid_time section holds the timestamp associated with the system design.

Figure 4:
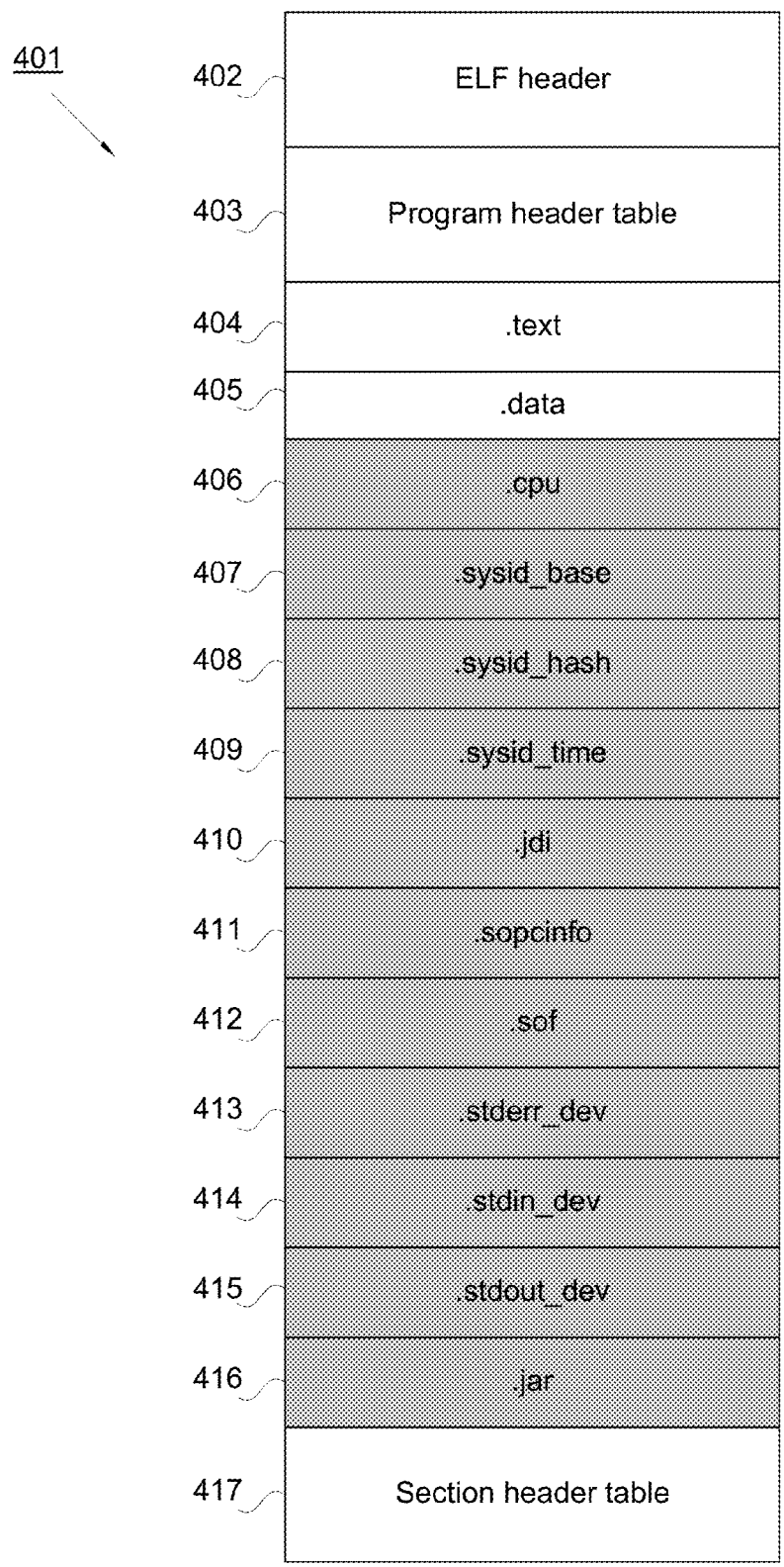
FIG. 4 illustrates another embodiment of a fat ELF file.

FIG. 4 is a diagrammatic representation of another example of a fat ELF 401 in the linking view. According to various embodiments, the fat ELF may include a .jdi section 410 which holds a file with the virtual JTAG information. For instance, the virtual JTAG information may include a design map to test the integrity of the JTAG chain. The integrity testing allows a user to determine whether the devices on the JTAG chain actually exist. In some other examples, the virtual JTAG information can be used to test the physical integrity of the programmable device such as short circuits, open circuits, or stuck-at-faults. This feature is invaluable because a device can be checked for production faults caused by manufacturing errors. In other examples, the virtual JTAG information can be used to allow in system programming. This feature allows an easy update of the image held on the device. In still other examples, the virtual JTAG information can be used for functional testing.

In particular embodiments, the fat ELF includes a .sopcinfo section 411 which stores a SOPC builder information file wherein the SOPC builder contains a complete system description. For instance, the SOPC builder information file may describe the parameterization of each component in the system such as the name and version, signal names and types, interface properties, clock domain, and parameter names and values. In another example, the SOPC builder information file may specify component connectivity such as component and interface connections, base address, Avalon-MM interfaces, IRQ number interfaces, or the memory map as seen by each master in the system.

In various embodiments, the fat ELF file includes a .sof section 412 which contains a bitstream. The bitstream allows the ELF loader to force a device to be configured to a particular specification. In particular embodiments, the fat ELF file includes a .stderr_dev section 413 which names the device for the standard error library. In yet another embodiment, the fat ELF file includes a .stdin_dev section 414 which names the device for standard input. In particular embodiments, the fat ELF file includes a .stddev_out section 415 which names the device for standard output. In particular embodiments, the fat ELF file includes a .jar section 416 which embeds an entire file system in a jar or zip file. This feature is useful for testing. For example, the .jar section 416 may include information to create an ELF file at run-time to retarget the program to a new device and/or tool chain.

It should be noted, a fat ELF file is not limited to the linking view. According to various embodiments, a fat ELF file is created by adding sections to the segments of an executable file in the execution view. In particular embodiments, a fat ELF is created by adding hardware information segments to an executable file. In particular embodiments, a consumer creates an ELF file similar to ELF file 201. After the ELF file is linked, an executable file similar to ELF file 202 is generated. Then the consumer manipulates the segments to include the additional hardware information.

Figure 5:
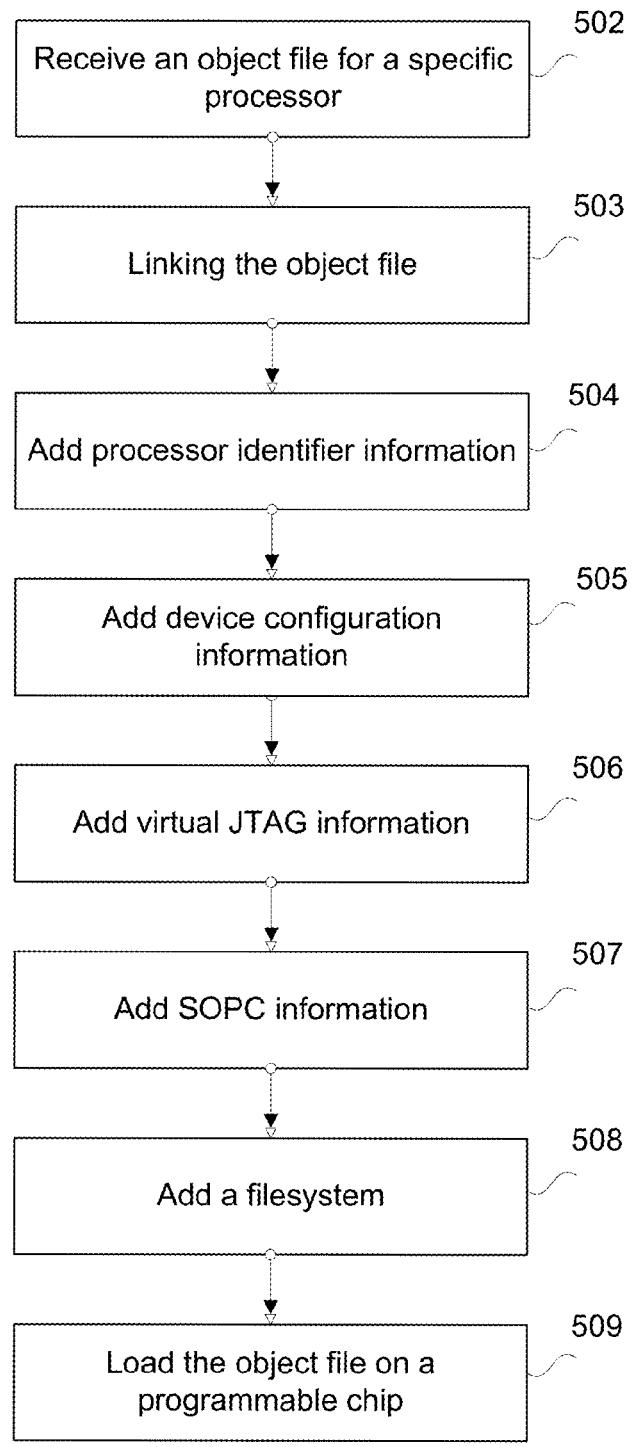
FIG. 5 illustrates an example method of generating a fat ELF file.

FIG. 5 illustrates an example technique for generating a fat ELF file. At 502, a user receives an object file to execute on a specific processor on a programmable chip. In various embodiments, the object file may be an ELF file, a Mach-O file, a PE file, etc. At 503, the user links the object file to generate an image file to execute on the programmable chip. At 504, the user may add a processor core identifier section that specifies the type of processor core the image file is intended to run on. The benefits of specifying the processor core are particularly notable in multi-processor systems where there is risk of executing a program on the incorrect processor. The ability to add processor specific information allows the end user to execute a program with increased reliability.

According to various embodiments, the user adds device configuration information sections at 505. In particular embodiments, the user may add a section with a bitstream to program an FPGA. This allows an ELF Loader to program the FPGA according to a specific configuration to include a processor that supports a particular image file. In some instances, the bitstream is used to program the FPGA when no processor of the appropriate type is available on the programmable device. At 506, the user adds a virtual JTAG information section. In particular embodiments, the user may use this information to determine the devices on the programmable chip. In yet another embodiment, the user may use this information to reconfigure the image of a device. According to various embodiments, a user adds an SOPC builder information section to the image file at 507. In various embodiments, the SOPC builder information section may include information about connectivity, interface properties, the memory map, and so forth. At 508, a user may add a section with an entire filesystem. This feature is useful for testing and debugging. In various embodiments, the filesystem may include information to create an ELF file at run time to retarget the program to a new device and/or toolchain. In particular embodiments, the user loads the image file on the programmable chip 509 after the addition of the hardware information.

In particular embodiments, steps 503-508 can be performed in any order. The user may generate a fat ELF file after linking the executable file. For instance, a user may add sections to segments of an image file. In another example, a user may add segments to the image file. In still another example, a user may add sections prior to linking and then add more sections after linking the object file. In yet another example, the user may add sections prior to linking and then add segments after linking the object file. Further, it should be noted some embodiments of the invention may have more or less sections than the sections and/or segments described in FIG. 5. The sections and segments added to an object file will vary depending on the requirements of a specific implementation.

Figure 6:
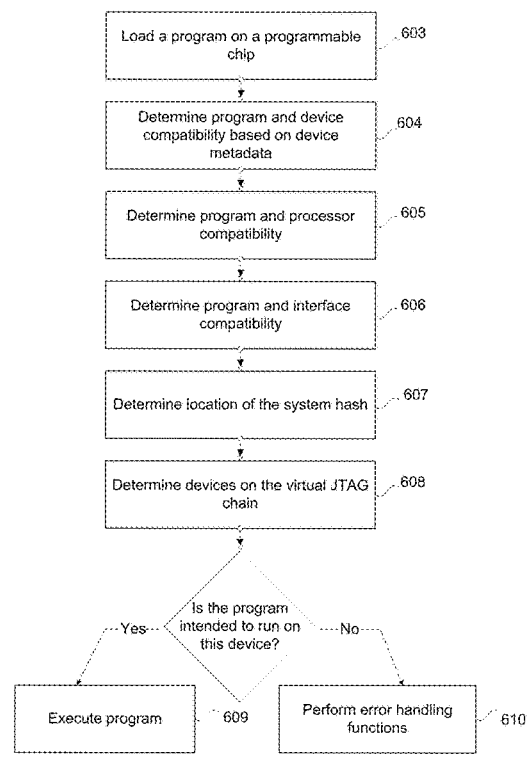
FIG. 6 illustrates an example method of loading and executing a fat ELF file.

FIG. 6 illustrates an example method for loading and executing a fat ELF file. At 603, the user loads the program on a programmable chip. Prior to executing the program, the hardware information is used to verify the programmable chip for the appropriate hardware. According to various embodiments, processes 604-608 are illustrative of such verification. At 604, the fat ELF file is used to determine whether the programmable device has the appropriate hardware based on the device's metadata. In various embodiments, the metadata contains information about the location of components and other architectural details. The fat ELF file may be used to determine the location of timers, serial communication interfaces, the input and outputs, I/O SDRAM controllers, and the like based on the metadata. If the device lacks the required hardware, then the device lacks the expected hardware. At 605, the program determines whether the device has the required processor. In particular embodiments, the hardware information identifies a particular CPU. If the programmable chip lacks the identified CPU, then the program and the hardware are incompatible.

At 606, the program determines program and interface compatibility. In various embodiments, a device includes multiple processors where each processor runs different programs. The fat ELF file is used to check the communication links between each processor. This feature allows multiple programs on different processors to work in unison especially where one program expects parameters or data from another program. In particular embodiments, the fat ELF file is used to test the I/O interface. The program tests whether the interface has the necessary logic to interpret the device address generated by a specific processor.

In yet another embodiment, the interface testing is a generic check of communication between components on a device. An interface may transmit data between clock domains, between analog and digital components, or between hardware and software components. The program can verify whether the components are making proper interface assumptions. At 607, the fat ELF file is used to determine the location of the system hash. In various embodiments, the hash represents the system design. The program searches for the hash key at a given location. If the hash key is not located at the given address, then the device lacks the appropriate hardware. At 608, the program determines if the devices on the virtual JTAG chain exist. In particular embodiments, the virtual JTAG chain may contain a design map of the device. The program can verify if all the components on the chain exist on the device. If a device is missing, then the device lacks the expected hardware. Based on these verification steps, the program can determine whether the device is compatible with the program.

It should be noted, some embodiments of the invention may include more or fewer steps of verification than the ones illustrated in FIG. 6. For instance, in one embodiment instead of determining the location of the hash, the program may be locating the system id. If the system id is not at the given location, then the fat ELF file provides safeguards against accidental execution of the program. The verification steps in FIG. 6 are only illustrative. Some embodiments may not require any of the verification steps or other embodiments may use different verification information altogether.

After the verification is completed, a determination is made whether the program and device are compatible. If the program and device are compatible, the program will execute 609. Otherwise, the program will perform error handling functions 610. In various embodiments, the error handling functions 610 are defined to stop the program from executing on the device and inform the user. In particular embodiments, the error handling functions may reconfigure the image on the hardware to force compatibility between the program and the device. For instance, the hardware information may include a bitstream to configure an FPGA. This allows the ELF loader to configure the device as required by the bitstream to a particular specification. In another example, the hardware information includes virtual JTAG information to update the image of the device in accordance with the program's requirements. In particular embodiments, the program may partially execute on the device such that the program skips incongruous portions of the code. This feature is useful in testing and debugging. For example, a device may only have certain components integrated in a system. The program may execute on the available components and test specific features of each component.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method, comprising:
receiving an executable program; and
generating an extensible linkable format file including the executable program and hardware information identifying hardware configured to execute the executable program, wherein the hardware information specifies one of a plurality of processor cores on a device to execute the executable program included in the extensible linkable format file;
wherein the device loads the extensible linkable format file and verifies the hardware information included in the extensible linkable format file prior to executing the executable program included in the extensible linkable format file, wherein the device is configured to correspond with the hardware information included in the extensible linkable format file, and wherein configuring the device to correspond with the hardware information included in the extensible linkable format file includes implementing functionality associated with the hardware information included in the extensible linkable format file in the device.

2. The method of claim 1, wherein the one of the plurality of processor cores is a soft-core processor on a programmable chip.

3. The method of claim 1, wherein the extensible linkable format file is an ELF file.

4. The method of claim 1, wherein the extensible linkable format file further comprises a program header table.

5. The method of claim 1, wherein the extensible linkable format file further comprises a section header table.

6. The method of claim 1, wherein the extensible linkable format file further comprises a processor identifier section that specifies a type of processor core the extensible linkable format file is intended to run on.

7. The method of claim 1, wherein the extensible linkable format file further comprises a bitstream operable to reprogram the one of the plurality of processor cores on the device.

8. The method of claim 1, wherein the extensible linkable format file further comprises virtual Joint Test Action Group (JTAG) information.

9. The method of claim 1, wherein the device skips incongruous portions of the executable program included in the extensible linkable format file when executing the executable program included in the extensible linkable format file.

10. An apparatus, comprising:
an interface configured to receive an executable program; and
a processor configured to generate an extensible linkable format file including the executable program and hardware information identifying hardware configured to execute the executable program, wherein the hardware information specifies one of a plurality of processor cores on a device to execute the executable program included in the extensible linkable format file;
wherein the device loads the extensible linkable format file and verifies the hardware information included in the extensible linkable format file prior to executing the executable program included in the extensible linkable format file, wherein the device is configured to correspond with the hardware information included in the extensible linkable format file, and wherein configuring the device to correspond with the hardware information included in the extensible linkable format file includes implementing functionality associated with the hardware information included in the extensible linkable format file in the device.

11. The apparatus of claim 10, wherein the one of the plurality of processor cores is a soft-core processor on a programmable chip.

12. The apparatus of claim 10, wherein the extensible linkable format file is an ELF file.

13. The apparatus of claim 10, wherein the extensible linkable format file further comprises a program header table.

14. The apparatus of claim 10, wherein the extensible linkable format file further comprises a section header table.

15. The apparatus of claim 10, wherein the extensible linkable format file further comprises a processor identifier section that specifies a type of processor core the extensible linkable format file is intended to run on.

16. The apparatus of claim 10, wherein the extensible linkable format file further comprises a bitstream operable to reprogram the one of the plurality of processor cores on the device.

17. The apparatus of claim 10, wherein the extensible linkable format file further comprises virtual Joint Test Action Group (JTAG) information.

18. The apparatus of claim 10, wherein the device skips incongruous portions of the executable program included in the extensible linkable format file when executing the executable program included in the extensible linkable format file.

19. A system, comprising:
means for receiving an executable program;
means for loading an extensible linkable format file, wherein the extensible linkable format file includes the executable program and hardware information identifying hardware configured to execute the executable program, and wherein the hardware information specifies one of a plurality of processor cores on a device to execute the executable program included in the extensible linkable format file;
means for verifying the hardware information included in the extensible linkable format file prior to executing the executable program included in the extensible linkable format file; and
means for configuring the device to correspond with the hardware information included in the extensible linkable format file, wherein configuring the device to correspond with the hardware information included in the extensible linkable format file includes implementing functionality associated with the hardware information included in the extensible linkable format file in the device.

20. The system of claim 19, wherein the one of the plurality of processor cores is a soft-core processor on a programmable chip.

21. The system of claim 19, further comprising means for skipping incongruous portions of the executable program included in the extensible linkable format file when executing the executable program included in the extensible linkable format file.

* * * * *